United States Patent
Sun

(10) Patent No.: US 8,462,948 B2
(45) Date of Patent: Jun. 11, 2013

(54) SYSTEM AND METHOD FOR PROTECTING DATA OF MOBILE PHONE

(75) Inventor: Jie Sun, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/310,713

(22) Filed: Dec. 3, 2011

(65) Prior Publication Data
US 2012/0189120 A1 Jul. 26, 2012

(30) Foreign Application Priority Data
Jan. 25, 2011 (CN) .................. 2011 1 0026826.1

(51) Int. Cl.
*G06F 21/00* (2006.01)
(52) U.S. Cl.
USPC .......................................... 380/247; 380/28
(58) Field of Classification Search
USPC .................................. 380/28, 247
See application file for complete search history.

(56) References Cited

U.S. PATENT DOCUMENTS

| | | | |
|---|---|---|---|
| 2003/0041251 A1* | 2/2003 | Kumhyr | 713/184 |
| 2004/0180694 A1* | 9/2004 | Lai et al. | 455/558 |
| 2009/0016525 A1* | 1/2009 | Bertoni et al. | 380/200 |

* cited by examiner

*Primary Examiner* — Brandon Hoffman
*Assistant Examiner* — Thong Truong
(74) *Attorney, Agent, or Firm* — Altis Law Group, Inc.

(57) ABSTRACT

In a method for protecting data of a mobile phone, the mobile phone includes a storage system. The storage system stores a plaintext file to be encrypted and an international mobile equipment identification (IMEI) number of the mobile phone. The IMEI number of the mobile phone and the plaintext file are read from the storage system. A ciphertext is generated from the plaintext file according to the IMEI number of the mobile phone using an encryption algorithm. The IMEI number of the mobile phone and the ciphertext are read from the storage system when the ciphertext needs to be decrypted. The plaintext file is recovered from the ciphertext according to the IMEI number of the mobile phone using a decryption algorithm.

18 Claims, 4 Drawing Sheets

SYSTEM AND METHOD FOR PROTECTING DATA OF MOBILE PHONE

BACKGROUND

1. Technical Field

Embodiments of the present disclosure relate generally to data protection, and more particularly, to a system and method for protecting data of a mobile phone.

2. Description of Related Art

Sometimes, people will store sensitive personal information in their mobile phones, such as credit card numbers, passwords, pictures etc. The information may be at risk if the mobile phone is lost or stolen. Many encryption algorithms, for example, data encryption standard, international data encryption algorithm, and advanced encryption standard, exist for protecting data. However, the algorithms are very complex for embedded systems of mobile phones. What is needed, therefore, is a simple and safe method for protecting data stored in mobile phones.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In the embodiment, "plaintext file" is defined as data (e.g., one or more text files or any other file formats) that is transmitted or stored unencrypted and is used as input to an encryption algorithm. In one example, the plaintext file may be data of a storage system to be encrypted.

Figure 1:
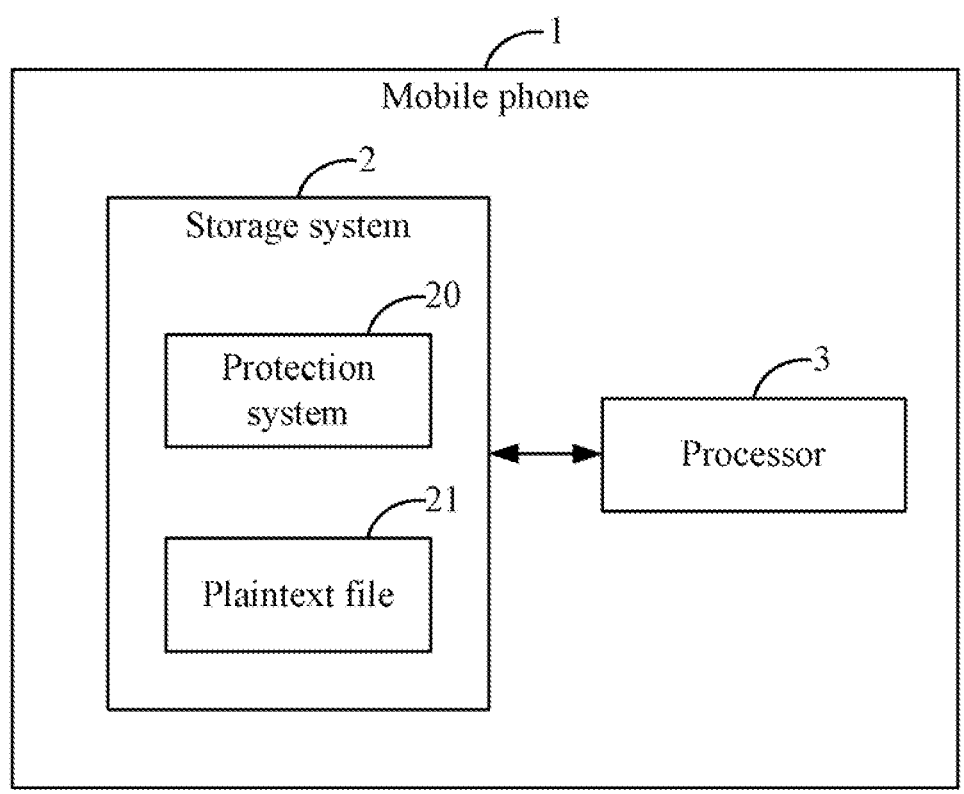
FIG. 1 is a block diagram of one embodiment of a mobile phone including a protection system for protecting data of the mobile phone.

FIG. 1 is a block diagram of one embodiment of a mobile phone 1 including a protection system 20 for protecting data of the mobile phone 1. In the embodiment, the mobile phone 1 further includes a storage system 2 and at least one processor 3. It should be apparent that FIG. 1 is just one example of the mobile phone 1 that can be included with more or fewer components than shown in other embodiments, or a different configuration of the various components.

The protection system 20 may be in the form of one or more programs stored in the storage system 2 and executed by the at least one processor 3. The storage system 2 further includes a plurality of data, such as music data, picture data, and text data. The protection system 20 can protect the data by encrypting and decrypting the data. In one embodiment, the storage system 2 may be random access memory (RAM) for temporary storage of information, and/or a read only memory (ROM) for permanent storage of information. In other embodiments, the storage system 2 may also be an external storage device, such as a storage card, or a data storage medium. The at least one processor 3 executes computerized operations of the mobile phone 1 and other applications, to provide functions of the mobile phone 1.

Figure 2:
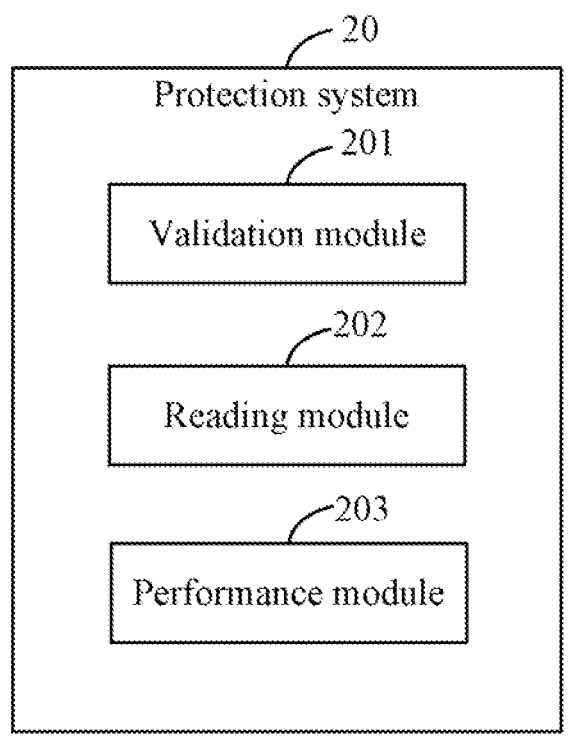
FIG. 2 is a block diagram of one embodiment of functional modules of the protection system included in the mobile phone of FIG. 1.

FIG. 2 is a block diagram of one embodiment of functional modules of the protection system 20 included in the mobile phone 1 of FIG. 1. In one embodiment, the protection system 20 may include a validation module 201, a reading module 202, and a performance module 203. The module 201-203 may comprise a plurality of functional modules each comprising one or more programs or computerized codes that can be accessed and executed by the at least one processor 3. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

In the embodiment, a user can enter an encryption password (e.g., a password used to encrypt data) in the mobile phone 1 via a touch screen or keyboard of the mobile phone 1 when the user wants to encrypt a plaintext file 21. The validation module 201 is operable to predefine a password rule. For example, the password rule should not include space symbols, or the encryption password is limited to a minimum of eight characters and a maximum of thirty-two characters.

The validation module 201 is further operable to acquire the encryption password input by the user, and validate whether the encryption password conforms to the predefined rule. The validation module 201 saves the encryption password into the storage system 2 when the encryption password conforms to the predefined rule.

The reading module 202 is operable to read an international mobile equipment identification (IMEI) number of the mobile phone 1 from the storage system 2 when the encryption password conforms to the predefined password rule. It is understood that the mobile phone 1 stores a unique IMEI number in the storage system 2. For example, the IMEI number of the mobile phone 1 can be 35395803 121326 9.

The reading module 202 is further operable to read the plaintext file 21 from the storage system 2.

The performance module 203 is operable to generate ciphertext from the plaintext file 21 according to the IMEI number of the mobile phone 1 using an encryption algorithm. The encryption algorithm could be an exclusive-OR (XOR) operation. For example, the performance module 203 performs the XOR operation on each byte of the plaintext file 21 and the byte corresponding to one of decimal digits of the IMEI number, and once all fifteen digits of the IMEI number have been used, the cycle is repeated with the first digit of the IMEI number once again. For example, the performance module 203 performs the XOR operation on the first byte of the plaintext file 21 and the byte corresponding to the first decimal digit of the IMEI number. Then the performance module 203 performs the XOR operation on the second byte of the plaintext file 21 and the byte corresponding to the second decimal digit of the IMEI number, and so on. After the XOR operation on the fifteenth byte of the plaintext file 21 and the byte corresponding to the fifteenth decimal digit of the IMEI number, the performance module 203 performs the XOR operation on the sixteenth byte of the plaintext file 21 and the byte corresponding to the first decimal digit of the IMEI number, and so on. The result of the XOR operation on the IMEI number of the mobile phone 1 and the plaintext file 21 is the ciphertext, and thus the plaintext file 21 is encrypted. For example, a line of text of the plaintext file 21 may be "I am an engineer", but the sentence becomes a group of unreadable symbols such as "@@XX]Q ZF Q\[^Z]PS" after the plaintext file 21 is encrypted.

After the plaintext file 21 is encrypted, the user must enter a corresponding decryption password in the mobile phone 1 via the touch screen or keyboard of the mobile phone 1 when the user wants to decrypt the ciphertext. The validation module 201 is further operable to acquire the decryption password input by the user, and validate whether the decryption password is identical to the encryption password stored in the storage system 2.

The reading module 202 is further operable to read the IMEI number of the mobile phone 1 and the ciphertext from the storage system 2 when the decryption password is identical to the encryption password.

The performance module 203 is further operable to recover the plaintext file 21 from the ciphertext according to the IMEI number of the mobile phone 1 using a decryption algorithm. The decryption algorithm could also be the XOR operation. For example, the performance module 203 performs the XOR operation on each byte of the ciphertext and the byte corresponding to one of the decimal digits of the IMEI number, and once all fifteen digits of the IMEI number have been used, the cycle is repeated with the first digit of the IMEI number once again. The result of the XOR operation on the IMEI number of the mobile phone 1 and the ciphertext is the plaintext file 21.

Figure 3:
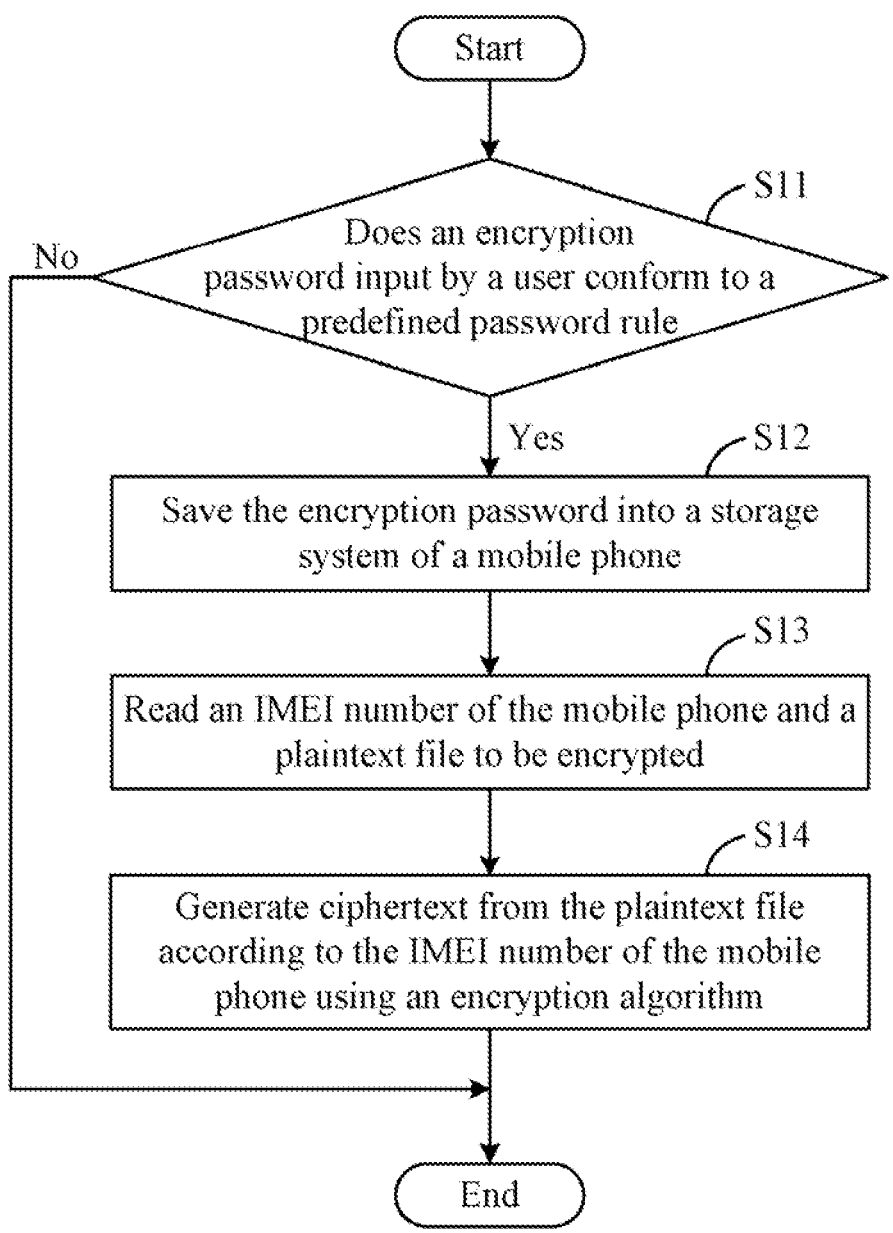
FIG. 3 is a flowchart of one embodiment of an encryption method for data of the mobile phone of FIG. 1.

FIG. 3 is a flowchart of one embodiment of an encryption method for data of the mobile phone 1 of FIG. 1. Depending on the embodiment, additional blocks may be added, others removed, and the ordering of the blocks may be changed. Before block S11, the validation module 201 is used to predefine a password rule, which is stored by the validation module 201 in the storage system 2.

In block S11, the validation module 201 acquires an encryption password input by the user via a touch screen or keyboard of the mobile phone 1, and validates whether the encryption password conforms to the predefined password rule. If the encryption password conforms to the predefined password rule, block 12 is implemented. If the encryption password does not conform to the predefined password rule, the procedure ends.

In block S12, the validation module 201 saves the encryption password into the storage system 2.

In block S13, the reading module 202 reads an IMEI number of the mobile phone 1 from the storages system 2, and reads the plaintext file 21 from the storage system 2.

In block S14, the performance module 203 generates ciphertext from the plaintext file 21 according to the IMEI number of the mobile phone 1 using an encryption algorithm. The encryption algorithm could be a XOR operation. The result of the XOR operation on the IMEI number of the mobile phone 1 and the plaintext file 21 is the ciphertext, and thus the plaintext file 21 is encrypted.

Figure 4:
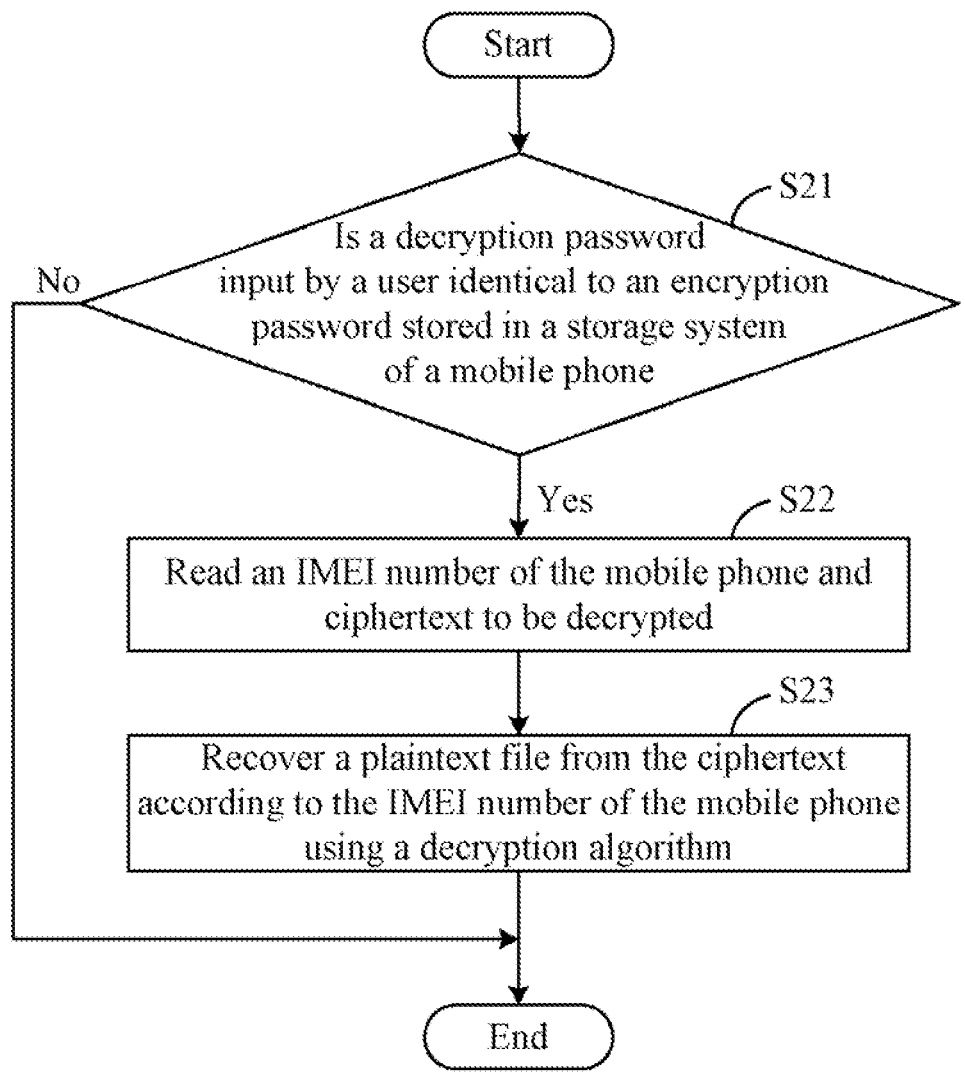
FIG. 4 is a flowchart of one embodiment of a decryption method for data of the mobile phone of FIG. 1.

FIG. 4 is a flowchart of one embodiment of a decryption method for data of the mobile phone 1 of FIG. 1.

In block S21, the validation module 201 acquires a decryption password input by the user via the touch screen or keyboard of the mobile phone 1, and validates whether the decryption password is identical to an encryption password stored in the storage system 2. If the decryption password is identical to the encryption password, block S21 is implemented. If the decryption password is not identical to the encryption password, the procedure ends.

In block S22, the reading module 202 reads the IMEI number of the mobile phone 1 and the ciphertext from the storage system 2.

In block S23, the performance module 203 recovers the plaintext file 21 from the ciphertext according to the IMEI number of the mobile phone 1 using a decryption algorithm. The decryption algorithm could also be the XOR operation. The result of the XOR operation on the IMEI number of the mobile phone 1 and the ciphertext is the plaintext file 21.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile phone, comprising:
   a storage system that stores data and an international mobile equipment identification (IMEI) number of the mobile phone;
   at least one processor; and
   one or more programs stored in the storage system and executable by the at least one processor, the one or more programs comprising:
   a reading module operable to read the IMEI number of the mobile phone and a plaintext file from the storage system; and
   a performance module operable to generate ciphertext from the plaintext file according to the IMEI number of the mobile phone using an encryption algorithm, and perform an exclusive-OR (XOR) operation on each byte of the plaintext file and the byte corresponding to one of digits of the IMEI number, wherein a cycle of the XOR operation is repeated with the first digit of the IMEI number once again when all the digits of the IMEI number have been used.

2. The mobile phone of claim 1, the one or more modules further comprising a validation module that acquires an encryption password input by a user, and validates whether the encryption password conforms to a predefined password rule.

3. The mobile phone of claim 2, wherein the validation module further saves the encryption password into the storage system when the encryption password conforms to the predefined password rule.

4. The mobile phone of claim 2, wherein:
   the validation module is further operable to acquire a decryption password input by the user when the ciphertext needs to be decrypted, and validate whether the decryption password is identical to the encryption password; and
   the reading module is further operable to read the IMEI number of the mobile phone and the ciphertext from the storage system when the decryption password is identical to the encryption password.

5. The mobile phone of claim 1, wherein:
   the performance module is further operable to recover the plaintext file from the ciphertext according to the IMEI number of the mobile phone using a decryption algorithm.

6. The mobile phone of claim 5, wherein the performance module performs an XOR operation on each byte of the ciphertext and the byte corresponding to one of the digits of the IMEI number.

7. A method for protecting data of mobile phone, comprising:
   (a) reading an international mobile equipment identification (IMEI) number of the mobile phone and a plaintext file to be encrypted from a storage system of the mobile phone; and
   (b) generating ciphertext from the plaintext file according to the IMEI number of the mobile phone using an encryption algorithm, and performing an exclusive-OR (XOR) operation on each byte of the plaintext file and the byte corresponding to one of digits of the IMEI number, wherein a cycle of the XOR operation is repeated with the first digit of the IMEI number once again when all the digits of the IMEI number have been used.

8. The method of claim 7, further comprising:
   acquiring an encryption password input by a user; and
   validating whether the encryption password conforms to a predefined password rule.

9. The method of claim 8, further comprising:
   saving the encryption password into the storage system when the encryption password conforms to the predefined password rule.

10. The method of claim 8, further comprising:
    acquiring a decryption password input by the user when the ciphertext needs to be decrypted, and validating whether the decryption password is identical to the encryption password; and
    reading the IMEI number of the mobile phone and the ciphertext from the storage system when the decryption password is identical to the encryption password.

11. The method of claim 7, further comprising:
    recovering the plaintext file from the ciphertext according to the IMEI number of the mobile phone using a decryption algorithm.

12. The method of claim 11, wherein the performance module performs an XOR operation on each byte of the ciphertext and the byte corresponding to one of the digits of the IMEI number.

13. A non-transitory storage medium storing a set of instructions, the set of instructions capable of being executed by a processor of a mobile phone, causes the mobile phone to execute a method for protecting data of the mobile phone, the method comprising:
    (a) reading an international mobile equipment identification (IMEI) number of the mobile phone and a plaintext file to be encrypted from a storage system of the mobile phone; and
    (b) generating ciphertext from the plaintext file according to the IMEI number of the mobile phone using an encryption algorithm, and performing an exclusive-OR (XOR) operation on each byte of the plaintext file and the byte corresponding to one of digits of the IMEI number, wherein a cycle of the XOR operation is repeated with the first digit of the IMEI number once again when all the digits of the IMEI number have been used.

14. The storage medium of claim 13, wherein the method further comprises:
    acquiring an encryption password input by a user; and
    validating whether the encryption password conforms to a predefined password rule.

15. The storage medium of claim 14, wherein the method further comprises:
    saving the encryption password into the storage system when the encryption password conforms to the predefined password rule.

16. The storage medium of claim 14, wherein the method further comprises:
    acquiring a decryption password input by the user when the ciphertext needs to be decrypted, and validating whether the decryption password is identical to the encryption password; and
    reading the IMEI number of the mobile phone and the ciphertext from the storage system when the decryption password is identical to the encryption password.

17. The storage medium of claim 13, wherein the method further comprises:
    recovering the plaintext file from the ciphertext according to the IMEI number of the mobile phone using a decryption algorithm.

18. The storage medium of claim 17, wherein the performance module performs an XOR operation on each byte of the ciphertext and the byte corresponding to one of the digits of the IMEI number.

* * * * *